Nov. 10, 1931.　　G. JOHNSON　　1,831,566
SNAP FASTENER STUD
Filed May 8, 1930
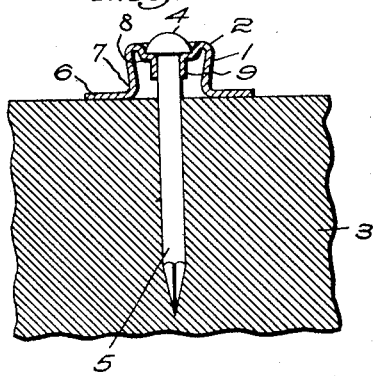
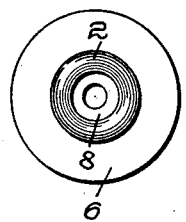 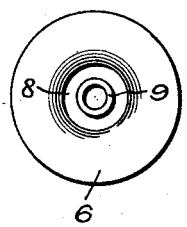
Inventor:
Gustav Johnson
by Emery Booth Varney & Townsend
Attys Patented Nov. 10, 1931

1,831,566

UNITED STATES PATENT OFFICE

GUSTAV JOHNSON, OF WEST ROXBURY, MASSACHUSETTS, ASSIGNOR TO UNITED-CARR FASTENER CORPORATION, OF CAMBRIDGE, MASSACHUSETTS, A CORPORATION OF MASSACHUSETTS

SNAP FASTENER STUD

Application filed May 8, 1930. Serial No. 450,735.

My invention aims to provide improvements in snap fastener studs and stud installations.

In the drawings which illustrate a preferred embodiment of my invention:—

Figure 1 is a section through a stud installation showing the nail in elevation;

Fig. 2 is a top plan of the stud part; and

Fig. 3 is a bottom plan of the stud part.

Referring now to the specific embodiment illustrated by the drawings, I have shown a stud member 1 of a snap fastener having a relatively flat head 2 and attached to a support 3 by means of an attaching member having a rounded head 4 and a shank 5. Any suitable attaching element may be used but I have preferred to show a nail which is driven into the support.

The snap fastener stud member 1 is constructed and arranged to withstand the normal pressure exerted upon it when the nail is being driven through it to secure it in place. Furthermore, the head 4 of the nail being rounded, I have in effect provided a flat headed stud member 1 with a round head thereby being readily adapted to guide into cooperating engagement with a socket (not shown) having an aperture to receive it.

The stud membes 1 is pressed from a single piece of metal and has a base 6 from which is pressed a hollow boss providing the head 2 and a neck 7. Centrally of the boss at the head end the metal is pressed toward the base 6 to provide a cup-shaped portion 8. Material of the bottom of the cup-shaped portion 8 is pressed or drawn to provide a tubular portion 9 extending toward the base 6.

When the stud member 1 is attached to the support 3 by means of the nail, as shown in Figure 1, the shank 5 of the nail is guided by the tubular portion 9 so that the nail may be driven straight. The tubular portion also strengthens the stud construction to prevent distortion of the head and neck portions, especially after the rounded head 4 is seated against the bottom of the cup-shaped portion 8 and struck a blow. If the tubular portion is omitted the bottom of the cup-shaped portion 8 has a tendency to bend toward the base 6 of the stud when subjected to a blow through the head 4 of the nail. If the portion 8 of the stud member is distorted the head 2 and neck 7 may be distorted, thereby preventing attachment of a socket thereto in the proper manner. Thus, it will be readily understood that the tubular portion gives strength to the stud to prevent crushing and also cooperates with the shank, because of the close fit, to effect the desired results.

While I have illustrated and described a preferred embodiment of my invention I do not wish to be limited thereby, because the scope thereof is best defined in the following claims.

Claims:

1. A snap fastener stud pressed from sheet metal and having a base, a boss pressed from said base to provide a stud head and neck, a cup-shaped portion pressed from said stud head and having an annular wall and a flat bottom, a tubular portion pressed from the bottom of said cup-shaped portion a substantial distance inwardly from the annular wall of said cup-shaped portion and being open at both ends the free end terminating in spaced relation to the plane of the base of the stud, said cup-shaped portion and said tubular portion being located entirely within said boss.

2. A snap fastener stud installation comprising, in combination, a snap fastener stud having a base and having a boss providing a head and a neck, a cup-shaped portion pressed from the material of said stud head, a tubular portion open at both ends pressed from the material of the base of said cup-shaped portion, a flat annular shoulder provided by the bottom of said cup-shaped portion, said cup-shaped portion and said tubular portion being located entirely within the said boss and the free end terminating in spaced relation to the plane of the base of the stud, a stud-supporting structure and an attaching member having a head seated against the annular shoulder provided by the bottom of said cup-shaped portion and also having a shank passing through and contacting with said tubular portion and engaging said supporting structure to hold the stud in position.

3. A snap fastener stud installation comprising, in combination, a stud-supporting structure, a snap fastener stud having a boss providing a head and a neck, a cup-shaped portion pressed from the material of said stud head, a tubular portion open at both ends pressed from the material of the base of said cup-shaped portion, said cup-shaped portion and said tubular portion being located entirely within the said boss and having its free end terminating in spaced relation to the stud-supporting structure, and an attaching member having a head seated against the bottom of said cup-shaped portion and also having a shank passing through and contacting with said tubular portion and engaging said supporting structure to hold the stud in position, said attaching member being in the form of a nail driven into said supporting structure and said cup-shaped portion and said tubular portion providing means preventing distortion of the stud head when the head of the nail is struck a blow after seating against the bottom of said cup-shaped portion.

In testimony whereof, I have signed my name to this specification.

GUSTAV JOHNSON.